Figure 7:
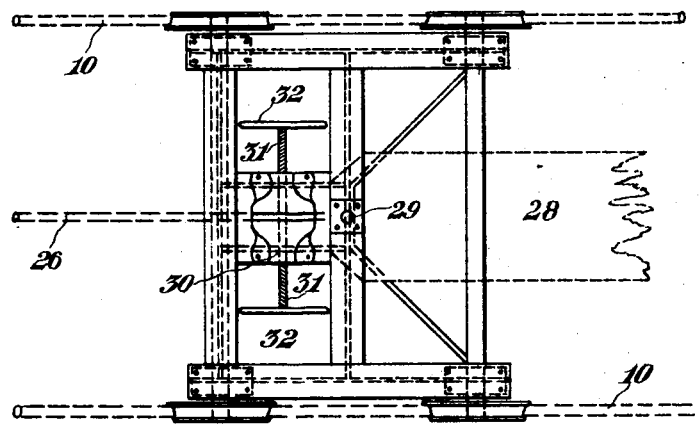

May 21, 1929.  D. A. McPHEE  1,714,183
AERIAL TRANSPORTATION SYSTEM
Filed Aug. 30, 1927   3 Sheets-Sheet 1
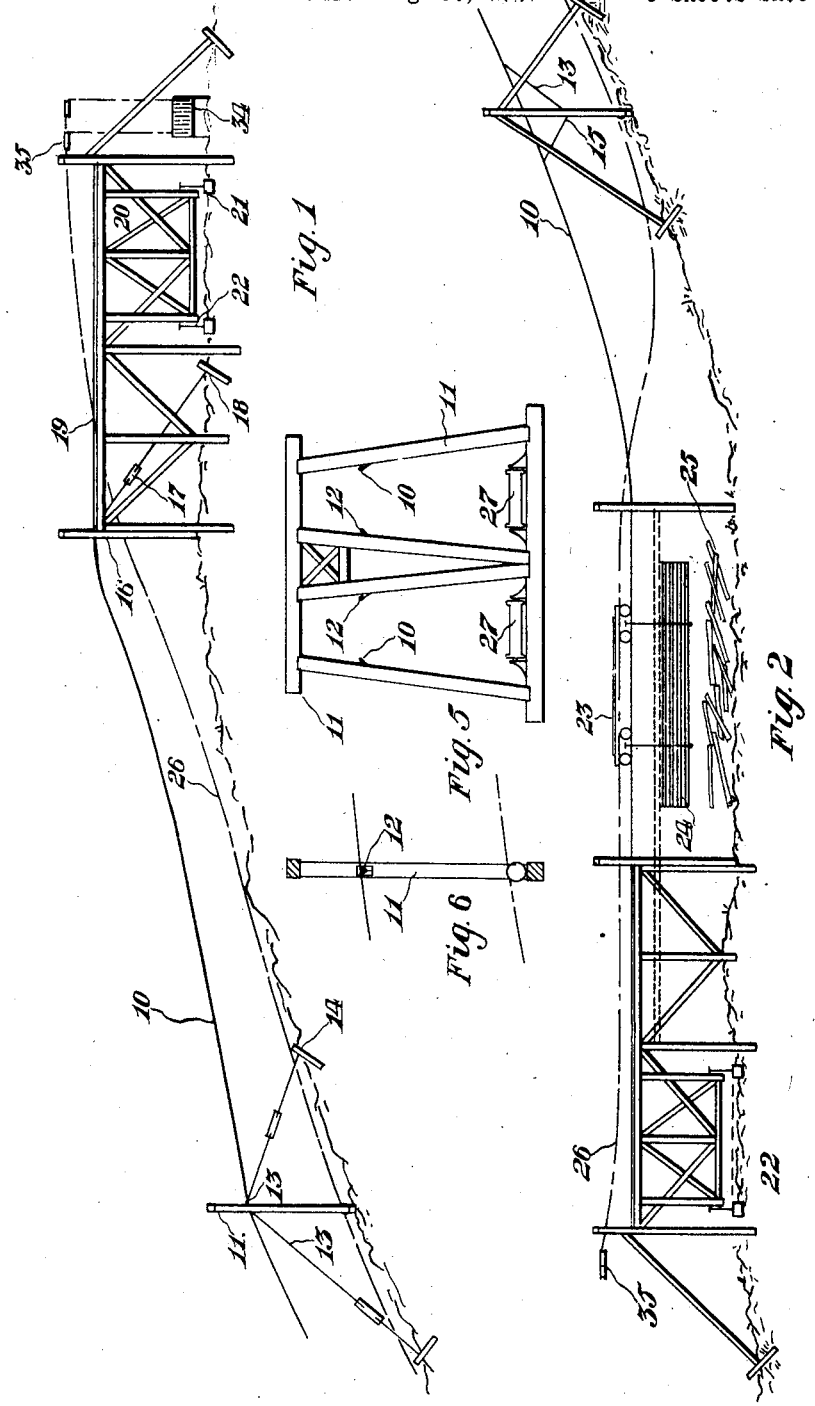
D. A. McPhee  Inventor
Attorney May 21, 1929.   D. A. McPHEE   1,714,183
AERIAL TRANSPORTATION SYSTEM
Filed Aug. 30, 1927   3 Sheets-Sheet 2
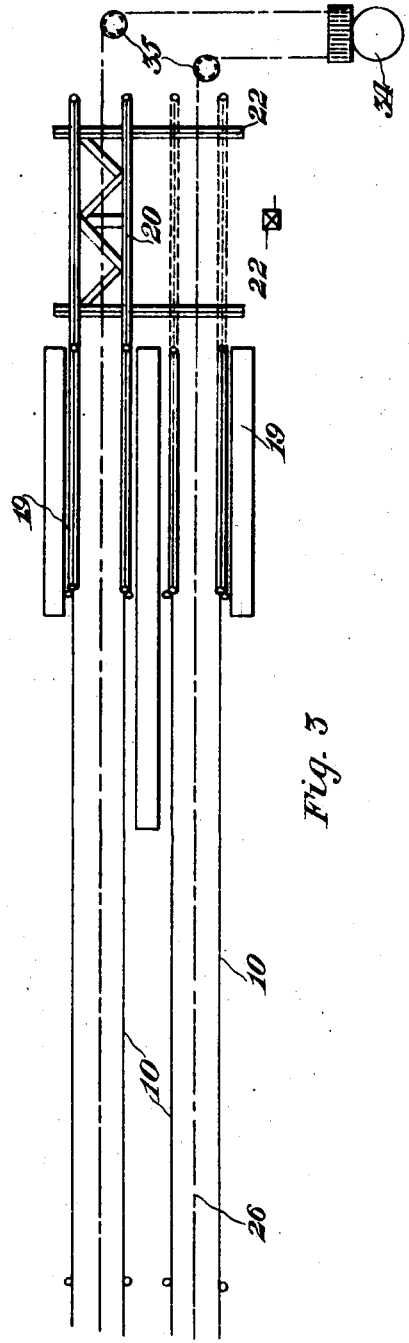
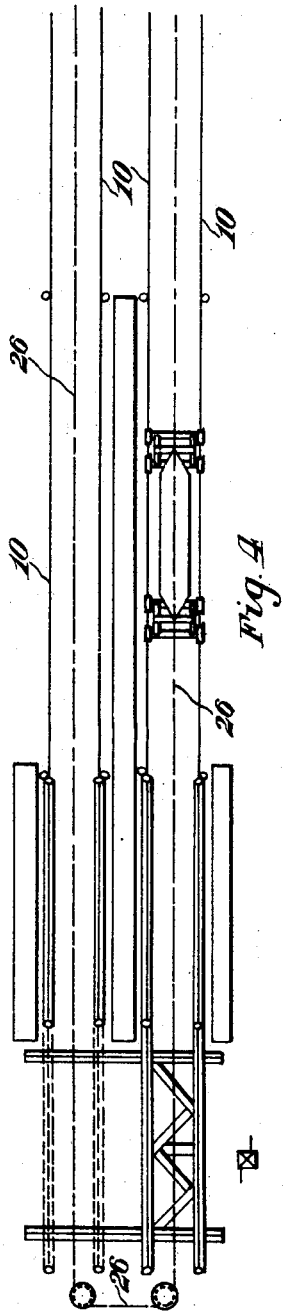
D. A. McPhee  Inventor
Attorney May 21, 1929.  D. A. McPHEE  1,714,183
AERIAL TRANSPORTATION SYSTEM
Filed Aug. 30, 1927   3 Sheets-Sheet 3

D. A. McPhee  Inventor
  Attorney

Patented May 21, 1929.

1,714,183

UNITED STATES PATENT OFFICE.

DONALD ALEXANDER McPHEE, OF VICTORIA, BRITISH COLUMBIA, CANADA.

AERIAL TRANSPORTATION SYSTEM.

Application filed August 30, 1927, Serial No. 216,479, and in Canada April 6, 1927.

This invention relates to improvements in aerial transportation systems for logging, mining, and other like industries where the transport of raw material and supplies is carried on over tracts of country which for various causes are more or less unsuited to other modes of carriage.

The object of the invention is to provide a more efficient aerial method of transport than those hitherto in use, and to take the place of systems using skid roads, truck roads, and inclined rail roads in logging, and also for the conveyance of pulp stock, mineral ores and the like.

Present methods of transportation where aerial suspension is employed are necessarily inefficient beyond a certain limited range of operation, in consequence of the ratio between the maximum available load and the distance between terminals, and my invention is designed to meet and remedy this defect.

The essential elements of my invention may be briefly summarized as follows:—
Two pairs of substantial track cables are laid, carried by brackets secured to and supported by bents erected at suitable frequent intervals depending on the nature of the ground surface. The intervals are such that lateral sway of the track cable is eliminated, the cable being tautly held by guys spliced into the under side of the track cable and firmly anchored.

A truck with flanged wheels suitable for running on the track cables and preferably designed on the double bogie principle with two axles to each bogie, an operating platform of timber uniting the two bogies by a central king pin at each end, with the load suspended below the operating platform. A haulage cable runs centrally of each track and connects with the truck by a suitable gripping device which is releasable and engageable by a right and left hand screw and hand wheel device, the weight of the slack portion of the cable being taken by friction rollers mounted at the lower part of each bent. At the two extremities of the four track cables a transverse transfer cradle is arranged. This takes the form of a low truck running across the ends of the double cable tracks on a short cross rail, the wooden superstructure of which carries a pair of metals in alignment with the cable tracks, and similarly adapted to engage the flanged wheels of the truck, so that the latter may be run on to the cradle and thence transferred to the other cable track by a short transverse movement of the cradle.

With this arrangement a load amounting to many times that usually considered permissible on an ordinary single cable suspension device is available, thus permitting an extension of range of service which hitherto only a properly equipped railroad could handle, even at a greatly increased cost. Moreover with my invention the greater part of the equipment can be readily lifted and re-erected elsewhere when the local work has been accomplished.

Figure 8:
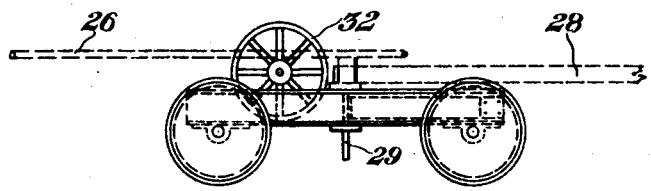
Figure 9:
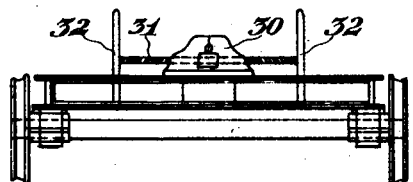

The details of the invention are better understood by reference to the drawings herewith which form part of this application, in which Fig. 1 is a side elevation of the loading terminal and track with bent, Fig. 2 is an elevation of the other end of the system, Figs. 3 and 4 are corresponding plans, Fig. 5 is a front elevation of a bent, Fig. 6 a side view, Fig. 7 is a plan of the carrier in part, and Figs. 8 and 9 are respectively side and end views of the same.

Taking the drawings in detail and noting that similar numerals in the different views indicate identical parts, 10 indicates the track cables four in number. These are supported in curved cradle brackets carried by and secured to the bents 11 at 12, and are held tautly at suitable intervals by guy cables 13 the top ends of which are spliced into the underside of the cable 10 and the lower end firmly anchored as at 14 or looped through roller brackets carried on the bent thus allowing for contraction and expansion stresses.

Terminal bents 16 support the ends of the track cables 10 which are adjusted as to tension by the stretching device 17 in connection with the anchor 18. Adjoining the terminal bent is a platform 19 carrying suitable rails in alignment with the track cables and providing a length of safety track for operating purposes. Beyond this is the transfer cradle 20 which takes the form of an elevated platform on the top surface of which is a pair of rails similar to and adapted to engage those on the safety track. A pair of rails 21 are laid transversely to the cable tracks and receive the travelling wheels of the cradle as shown at 22. By this arrangement the truck or log carrier may be rapidly transferred from one cable track to the other.

The loading area (usually on high ground) is shown by Fig. 1, the unloading area being shown by Fig. 2. The log carrier in the form of a double bogie truck is indicated at 23 with the load of logs suspended below it at 24, and a pile of discharged logs at 25. A haulage cable 26 by which the load is raised or lowered by the usual donkey engine rides over friction rollers 27 located on the mud sill of the bents 11 easing the load and avoiding damage.

The log carrier 23 is shown in detail in Fig. 7. It is by preference of the bogie type, one unit being here shown. The two bogies are united by the wood member 28 which also serves as an operating platform and pivots centrally on each bogie at the king pin 29. The load is slung below the carrier affording the necessary low centre of gravity in relation to the cable track 10. A gripping device 30 positioned on the longitudinal centre line of the carrier makes engagement with the haulage cable 26, where the right and left handed screw 31 with its axis at right angles to the haulage cable is rotated by the hand wheel 32, thus drawing the members 33 into gripping contact with the cable. The winding drum in connection with the donkey engine and gear for motivating the haulage cable 26 is indicated at 34 and the sheaves which support and guide the cable at 35.

The system is primarily designed for use where some form of inclined railroad would otherwise be necessary and involving a considerably greater expense, such as for tapping highland districts of timber, or mountainous country for ores. In such cases the expenditure of power is low as the load is transported to the sea or lower level by gravitation under brake control through the haulage cable, the descending load being utilized to hoist the empty carrier, the latter being transferred to the up or down track by the manipulation of the transfer cradle truck at either end of the line.

Having now ascertained the nature of this my said invention, I declare that what I claim and desire to secure by Leters Patent, is:—

1. In an aerial transportation system the combination comprising, a double pair of cable tracks suitably supported by bents and held tautly against lateral sway by properly disposed adjustable guys, a bogie truck carrier having flanged wheels adapted to engage a pair of the said cable tracks, the said carrier being adapted for a load slung below it and the said cable tracks, an elevated platform at each terminus of the said tracks for operating the said system, a transfer cradle of the nature of an elevated truck at each outer extremity of the said platform and working transversely thereof, the said platform being provided with tracks suitable to connect the said cable tracks with the tracks of the said transfer cradle, the said platform and said cradle being adapted to receive and control the said carrier, a haulage cable securable centrally and longitudinally to and of the said carrier, and regulatable means for hoisting and lowering the said carrier by the said cable.

2. In an aerial transportation system the combination comprising, a freight carrier of the double bogie type having flanged wheels adapted for cable traction, the said carrier being adapted to support a load slung below it and the two said bogies, two pairs of cable tracks suitably supported by bents and held tautly against lateral sway by adjustable guys, one pair of the said cables being adapted to engage the said flange wheels and support the said carrier, an elevated operating platform at each end of the said cable tracks, a transfer cradle at each end of the said system, traction wheels carrying the said cradle and rails for same, the said rails being transverse to the said tracks and adjacent the end and foot of the said platform, the said platform and said cradle carrying on their upper surfaces tracks in alignment with the said cable tracks and adapted to similarly engage the said flanged wheels, the structure of the said cradle being such that it may receive the said carrier from one track and transfer it to the other track, a haulage cable disposed centrally between the cables of each of the said pairs of cable tracks and detachably secured by a suitable gripping device to the said carrier.

3. In an aerial transportation system the combination comprising, a freight carrier of the double bogie type having flanged wheels adapted for cable traction, the said carrier being adapted to support a load suspended below it, a plurality of pairs of cable tracks suitably supported by bents and held tautly against lateral sway by adjustable guys, any said pair of tracks being adapted to engage the said flange wheels and support the said carrier, an elevated operating platform at the two extremities of the said cable tracks, and a haulage cable centrally disposed between each of the cables forming each said pair of tracks and means for removably connecting the said cable with the said carrier.

D. A. McPHEE.